United States Patent

Perronnet et al.

[11] 3,801,302
[45] Apr. 2, 1974

[54] HERBICIDAL METHOD
[75] Inventors: Jacques Perronnet; Pierre Girault, both of Paris, France
[73] Assignee: Roussel UCLAF, Paris, France
[22] Filed: Sept. 15, 1971
[21] Appl. No.: 180,852

[30] Foreign Application Priority Data
Sept. 17, 1970 France .............................. 70.33715

[52] U.S. Cl. ................................................. 71/121
[51] Int. Cl. ................................................ A01n 9/20
[58] Field of Search ............... 260/566 B; 424/327; 71/121

[56] References Cited
UNITED STATES PATENTS
3,305,347  2/1967  Minieri .................................. 71/121
FOREIGN PATENTS OR APPLICATIONS
6,903,247  9/1970  Netherlands
1,455,835  9/1966  France OTHER PUBLICATIONS
German Patent 1,909,868, Chem Abst. J0172, (1970), 54978e.

Primary Examiner—Lewis Gotts
Assistant Examiner—Catherine L. Mills
Attorney, Agent, or Firm—Hammond & Littell

[57] ABSTRACT

Herbicidal compositions comprising an effective amount of at least one compound of the formula

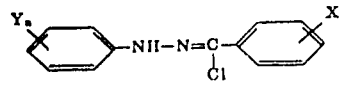

wherein X is selected from the group consisting of hydrogen and lower alkyl of one to six carbon atoms when Y is selected from the group consisting of bromine and chlorine and when Y is hydrogen, X is selected from the group consisting of chlorine, bromine and lower alkyl of one to six carbon atoms and $n$ is 1, 2 or 3 and to a method of killing plants.

4 Claims, No Drawings

HERBICIDAL METHOD

STATE OF THE ART

Netherland Pat. application Ser. No. 69-03247 describes hydrazines of the formula

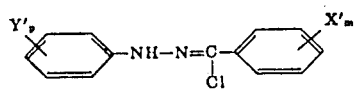

wherein X' and Y' are halogen, nitro or alkyl, m is 0 to 5 and p is 0 to 3 with the sum of $m + p$ being at most equal to 6 and their use as insecticides.

OBJECTS OF THE INVENTION

It is an object of the invention to provide novel herbicidal compositions containing at least one compound of formula I as the active ingredient.

It is a further object of the invention to provide a novel method of killing plants.

These and other objects and advantages of the invention will become obvious from the following detailed description.

THE INVENTION

The novel herbicidal compositions of the invention are comprised of an effective amount of at least one compound of the formula

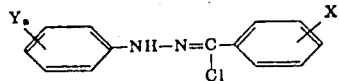

wherein X is selected from the group consisting of hydrogen and lower alkyl of one to six carbon atoms when Y is selected from the group consisting of bromine and chlorine and when Y is hydrogen, X is selected from the group consisting of chlorine, bromine and lower alkyl of one to six carbon atoms and n is 1, 2 or 3 and an inert carrier. The compositions may also contain one or more other pesticidal agents.

The compositions may be in the form of powders, granules, suspensions, emulsions, or solutions containing, for example, other active principles, cationic, nonionic, or anionic surface active agents, inert powders such as talc, clay, silicates, kieselguhr, etc, a vehicle such as water, alcohol, hydrocarbons or other organic solvents, animal, vegetable or mineral oils, etc.

An example of a specific composition in the form of a emulsifiable concentrate is 10 percent by weight of N-(α-chloro-4'-methyl-benzylidene)-4-chloro-phenylhydrazine, 6 percent by weight of Atlox 4851 (alkylaryl sulfonate mixed with a polyoxyethylene triglyceride with a viscosity of 300-700 cps at 25°C, soluble in water), 4 percent by weight of Atlox 4855 (alkylaryl sulfonate mixed with a polyoxyethylene triglyceride with a viscosity of 1,500 to 1,900 cps at 25°C, dispersible in water), 40 percent by weight of cyclohexanone and 40 percent by weight of xylene. The compositions generally contain 5 to 80 percent, preferably 10 to 50 percent, by weight of the active compounds of formula I.

Particularly preferred compounds of formula I are N-(α-chloro-3'-chloro-benzylidene)-phenylhydrazine, N-(α-chloro-benzylidene)-4-chloro-phenylhydrazine, N-(α-chloro-4'-methyl-benzylidene)-4-chloro-phenylhydrazine and N-(α-chloro-benzylidene)-2,4,6-trichloro-phenylhydrazine.

The herbicidal properties of the compounds of formula I have been shown in tests with plants of a great number of botanical families such as wheat, oats, corn, vulpin of the grass family, chrysanthemum of the composacae family, flax of the linaceae family, mustard of the cruciferaceae family, clover of the papilionaceae family and beets of the chenopodiaceae family.

The novel method of the invention for killing plants comprises contacting plants with a herbicidal amount of at least one compound of formula I. The compounds can be applied in any conventional manner but are preferably employed as post-emergence by spraying or other suitable means. The usual dosage is 0.5 to 10 kg per ha.

The compounds of formula I may be prepared by reacting in the presence of a tertiary base a phenylhydrazine of the formula

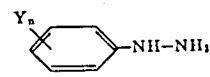

where Y and n have the above definitions with a benzoyl halide of the formula

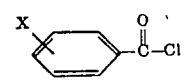

wherein X has the above definition to obtain a benzyhydrazide of the formula

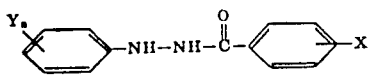

and reacting the latter with first a chlorination agent and then phenol to obtain the corresponding compound of formula I.

The condensation of the benzoyl chloride of formula IV with the phenylhydrazine of formula III is preferably effected in the presence of pyridine. The preferred chlorination agent is phosphorus pentachloride although phosphorus oxychloride or a mixture of phosphorus oxychloride and phosphorus pentachloride can also be used. The chlorination reaction may be effected in an organic solvent such as ethyl ether or isopropyl ether or in the absence of a solvent.

The reaction of the benzyhydrazide of formula V with phosphorus pentachloride results in the formation of a dichlorophosphinyl phenylhydrazone of the formula

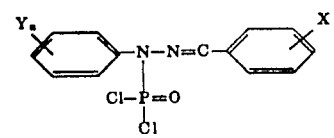

which when reacted with phenol results in the corresponding hydrazone of formula I.

N-(α-chloro-benzylidene)-2,4,6-trichloro-phenylhydrazine may be prepared by reacting the phenylhydrazone of benzaldehyde with chlorine, preferably in an organic solvent such as ethyl acetate.

The phenylhydrazines of formula III are described in the literature or can be made by known processes. For instance, phenylhydrazine is described in Beilstein, Vol. 15, p. 67; I, p. 23; II, p. 44; 4-chlorophenylhydrazine is described in Beilstein, Vol. 15, p. 425; I, p. 106; II, p. 150 and 2,4,6-trichlorophenylhydrazine is described in Beilstein, Vol. 15, p. 134; I, p. 31; II, p. 57. The phenylhydrazone of benzaldehyde is described in Beilstein, Vol. 15, p. 134; I, p. 31; II, p. 57.

The benzoyl chlorides of formula IV are described in the literature or can be made by known processes. For example, 4-methylbenzoylchloride is described in Beilstein, Vol. 9, p. 486; I, p. 193; II, p. 329 and 3-chlorobenzoyl chloride is described in Beilstein, Vol. 9, p. 338; I, p. 139; II, p. 224.

In the following examples there are described several preferred embodiments to illustrate the invention. However, it should be understood that the invention is not intended to be limited to the specific embodiments.

EXAMPLE I

N-(α-chloro-4'-methyl-benzylidene)-4-chloro-phenylhydrazine STEP A: β-(4'-chlorophenyl)-4-methyl-benzhydrazide 100 g of 4-chloro-phenylhydrazine were added to 500 ml of pyridine and then 113 g of 4-methyl-benzoyl chloride was added thereto at 5°C. The mixture was stirred for 16 hours at 20°C and the reaction mixture was then poured into a icewater mixture. The precipitate formed was recovered by vacuum filtration, was washed and then dried to obtain 154 g of β-(4'-chlorophenyl)-4-methyl-benzhydrazide melting at 218°C. A sample of the product melted at 218°C after crystallization from ethanol.

Analysis: $C_{14}H_{13}ClN_2O$; molecular weight = 260.72

| | | | |
|---|---|---|---|
| Calculated: | % C 64.49 | % Cl 13.60 | % N 10.74 |
| | | % H 5.02 | | |
| Found: | 64.2 | 4.9 | 13.6 | 10.3 |

As far as is known, this compound is not described in the literature.

STEP B: N-(α-chloro-4'-methyl-benzylidene)-4-chloro-phenylhydrazine 104 g of β-(4'-chlorophenyl)-4-methylbenzhydrazide and then 100 g of phosphorus pentachloride were added to 600 ml of ethyl ether and the mixture was stirred for 1 hour at 20°C and then refluxed for 1 hour and cooled at 20°C. The mixture was stirred for 16 hours at 20°C and then cooled at 0°C. A mixture of 120 g of phenol and 120 cc of ethyl ether was added thereto and the mixture was stirred for 15 minutes at 0°C and then poured into 400 ml of methanol. The mixture was stirred for 1 hour at 20°C and the ether was distilled off. After cooling to 0°C, crystallization was allowed and the crystals formed were recovered by vacuum filtration. The product was washed with iced methanol and dried to obtain 73 g of N-(α-chloro-4'-methyl-benzylidene)-4-chloro-phenylhydrazine melting at 117°C. Crystallization from acetonitrile did not change the melting point.

Analysis: $C_{14}H_{12}Cl_2N_2$; molecular weight = 279.17

| | | | |
|---|---|---|---|
| Calculated: | % C 60.22 | % H 4.33 | % Cl 25.40 | % N 10.04 |
| Found: | 60.0 | 4.2 | 25.3 | 10.1 |

As far as is known, this product is not described in the literature.

EXAMPLE II

N-(α-chloro-3'-chloro-benzylidene)-phenylhydrazine

Using the procedure of Step A of Example I, phenylhydrazine and 3-chlorobenzoyl chloride were reacted to obtain β-phenyl-3-chloro-benzhydrazide melting at 164°C. The latter is then reacted with phosphorus pentachloride as in Step B of Example I to obtain N-(α-chloro-3'-chloro-benzylidene)-phenylhydrazine melting at 76°C.

As far as is known, both the final hydrazone and the benzhydrazide are not described in the literature.

EXAMPLE III

N-(α-chloro-benzylidene)-4-chloro-phenylhydrazine

Using the procedure of Steps A and B of Example I; 4-chloro-phenylhydrazine and benzoyl chloride are reacted to obtain β-(4-chlorophenyl)-benzhydrazide melting at 154°C which is then reacted with phosphorus pentachloride to obtain N-(α-chloro-benzylidene)-4-chloro-phenylhydrazine melting at 112°C.

EXAMPLE IV

N-(α-chloro-benzylidene)-2,4,6-trichloro-phenylhydrazine

Using the procedure of Steps A and B of Example I, benzoyl chloride and 2,4,6-trichloro-phenylhydrazine were reacted to form β-(2,4,6-trichlorophenyl)-benzhydrazide melting at 166°C which was reacted with phosphorus pentachloride to form N-(α-chloro-benzylidene)-2,4,6-trichloro-phenylhydrazine melting at 97°C.

EXAMPLE V 50 g of the phenylhydrazone of benzaldehyde in 600 ml of ethyl acetate was cooled to 8°C and a current of chlorine was bubbled through the solution at a temperature below 15°C for 45 minutes. The mixture was cooled to 5°C and the precipitate formed was recovered by vacuum filtration and was dried to obtain 60 g of N-(α-chloro-benzylidene)-2,4,6-trichloro-phenylhydrazine melting at 97°C. The said product is described by Humphries et al. [Soc. 1925, p. 1304].

POST-EMERGENCE HERBICIDAL ACTIVITY

The nine vegetables used in this study were cultivated in a cultivation flat (23 × 14 × 4 cm) having a double bottom and watered from below. The nine species were planted, using 20 grains per species, in spaced rows of 3 cm in a single flat and 4 flats were used for each concentration. The culture conditions were as follows: 20° ± 2°C temperature; about 60 percent humidity; lighting by fluorescent tube (daylight + bright light) for 6 to 22 hours each day. The soil mixture was comprised of 10 volumes of normal dirt, 10 volumes of river sand and 2 volumes of peat moss. The treatment was effected after 21 days on the above ground part of the plants. The test products were applied under standard conditions with a microsprayer at doses of 5, 2.5, 1.25, 0.6kg/ha at a dilution corresponding to 560 liters per ha. The same procedure was followed without spraying to obtain controls for the test. The final results were determined from the weight of the plants 15 days after the post-emergence spray treatment and are expressed as a percentage of reduction of vegetation P.

P = weight of control plants-weight of treat plants/weight of control plants × 100

The results are summarized in Tables I to III.

TABLE I

A, N-(α-chloro-3'-chloro-benzylidene) phenylhydrazine

| | Doses in kg per ha | | | |
|---|---|---|---|---|
| | 5 | 2.5 | 1.25 | 0.6 |
| Oats | 100 | 100 | 100 | 100 |
| Wheat | 100 | 100 | 90 | 90 |
| Corn | 75 | 75 | 60 | 40 |
| Vulpine | 100 | 100 | 75 | 10 |
| Beets | 100 | 100 | 100 | 100 |
| Chrysanthemum | 100 | 100 | 100 | 100 |
| Flax | 100 | 100 | 100 | 100 |
| Mustard | 100 | 100 | 100 | 100 |
| Clover | 100 | 100 | 100 | 100 |

TABLE II

B, N-(α-chloro-4'-methyl-benzylidene)-4-chloro-phenylhydrazine

| | Doses in kg per ha | | | |
|---|---|---|---|---|
| | 5 | 2.5 | 1.25 | 0.6 |
| Oats | 100 | 100 | 100 | 75 |
| Wheat | 100 | 100 | 100 | 100 |
| Corn | 40 | 15 | 20 | 5 |
| Vulpine | 100 | 70 | 70 | 20 |
| Beets | 100 | 100 | 100 | 100 |
| Chrysanthemum | 100 | 100 | 100 | 100 |
| Flax | 100 | 100 | 100 | 100 |
| Mustard | 100 | 100 | 100 | 100 |
| Clover | 100 | 100 | 100 | 100 |

TABLE III

C, N-(α-chloro-benzylidene)-2,4,6-trichloro-phenylhydrazine

| | Doses in kg per ha | | | |
|---|---|---|---|---|
| | 5 | 2.5 | 1.25 | 0.6 |
| Oats | 90 | 75 | 50 | 40 |

TABLE III—Continued

C, N-(α-chloro-benzylidene)-2,4,6-trichloro-phenylhydrazine

| | Doses in kg per ha | | | |
|---|---|---|---|---|
| Wheat | 43 | 47 | 13 | 0 |
| Corn | 15 | 1 | 0 | 0 |
| Vulpine | 80 | 10 | 10 | 0 |
| Beets | 100 | 100 | 100 | 100 |
| Chrysanthemum | 100 | 100 | 100 | 100 |
| Flax | 100 | 100 | 100 | 100 |
| Mustard | 100 | 100 | 100 | 100 |
| Clover | 100 | 100 | 100 | 100 |

The said Tables show that the tested compounds have a remarkable post-emergence herbicidal activity against the plants tested. However, it should be noted that compound B and especially compound C are relatively safe for the corn.

Various modifications of the compositions and method of the invention may be made without departing from the spirit or scope thereof and it should be understood that the invention is to be limited only as defined in the appended claims.

We claim:

1. A post-emergence method of killing plants which comprises contacting plants with a herbicidal amount of at least one phenylhydrazone of the formula

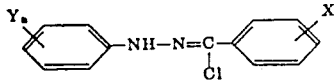

wherein when Y is hydrogen, X is lower alkyl of one to six carbon atoms and when Y is selected from the group consisting of chlorine and bromine, X is selected from the group consisting of hydrogen and lower alkyl of one to six carbon atoms and $n$ is 1, 2 or 3.

2. The method of claim 1 wherein the phenylhydrazone is N-(α-chloro-4'-methyl-benzylidene)-4-chloro-phenylhydrazine.

3. The method of claim 1 wherein the phenylhydrazone is N-(α-chloro-benzylidene)-4-chloro-phenylhydrazine.

4. The method of claim 1 wherein the phenylhydrazone is N-(α-chloro-benzylidene)-2,4,6-trichloro-phenylhydrazine.

* * * * *